Oct. 22, 1957 O. L. HIBBARD ET AL 2,810,621

RECORD RECEIVER MECHANISM

Filed May 24, 1954 2 Sheets-Sheet 1

INVENTORS
OSCAR L. HIBBARD
MILLARD L. BRAIN

BY J. Jancev Jr.

ATTORNEY

Oct. 22, 1957 O. L. HIBBARD ET AL 2,810,621

RECORD RECEIVER MECHANISM

Filed May 24, 1954 2 Sheets-Sheet 2

INVENTORS
OSCAR L. HIBBARD
MILLARD L. BRAIN
BY
J. Janein Jr.
ATTORNEY 2,810,621

RECORD RECEIVER MECHANISM

Oscar L. Hibbard, Johnson City, and Millard L. Brain, Endicott, N. Y., assignors to International Business Machines Corporation, New York, N. Y., a corporation of New York Application May 24, 1954, Serial No. 431,774

8 Claims. (Cl. 346—79)

This invention relates in general to record receivers and, particularly, to receivers of the type in which a record card is inserted for registration with a record card data input and/or output means.

The general object of this invention is to provide an improved record receiver.

The record card receiver embodiment of the present invention described herein is of the geenral type shown and described in F. Q. Rast Patent No. 2,281,998, which issued on May 5, 1942. That is, a receiver having an opening in one end thereof in which a card is manually inserted to receive a data recording thereon consequent upon the leading edge of the card operating a pair of control contacts, and from which a card is removed after the recording operation has ended. The apparatus associated with the afore-mentioned control contacts is ordinarily spring biased in such a fashion that the operator manually inserting the card must overcome the spring-bias in order to operate the contacts. This spring-bias is ever present so that the card must be held in place in the receiver lest the control contacts apparatus move the card in a direction toward the receiver opening.

It may be pointed out that in a time recorder of the Rast patent type in which a card is inserted to receive an automatic time registration thereon, the afore-described "spring-bias" effect upon the card is not objectionable. This is primarily for the reasons that the time registration operation occurs very rapidly, i. e., while the card insertion momentum is still effective to keep the leading edge of the card against a fixed card stop at the second end of the card receiver, and because only a printing operation takes place during the recording of time, for example, upon the card, a printing operation not requiring as accurate registration as a punching operation, for instance.

The spring-bias effect is both troublesome and objectionable, however, in a card recorder which may record perforate indicia and print legible characters, as well as a card recorder which includes an indicia sensing means. This, as anyone familiar with the recording art in general will understand, is for the reason that record card perforate indicia, for example, must be kept within extremely close limits of tolerance.

A toll highway recorder having card sensing, punching and printing means is shown and described in a copending U. S. patent application, Serial No. 399,229, filed on December 21, 1953. It is extremely important to the proper operation of this recorder that the card inserted into the receiver thereof is maintained in registration with the card data sensing and recording apparatus during the entire period of recorder operation.

According to the embodiment of the present invention, in response to the card having been initially inserted into the card receiver of a recorder a distance sufficient to cause the leading edge of the card to close a pair of control contacts, a card positioning and holding mechanism moves the card against a fixed card stop to thereby place the card index positions in true alignment with the card sensing and recording elements, and holds the card in engagement with the card stop until the recorder operating cycle is completed.

Another object of this invention is to provide an improved receiver for automatically completely inserting therein a record card that has been partially inserted.

Another object of this invention is to provide a receiver for initially positioning a record card therein in registration with a record card data input and/or output means.

In keeping with the foregoing, another object of this invention is to provide a receiver for holding the record card in registration a predetermined period of time immediately after the record card has been positioned.

A still another object of this invention is to provide a receiver having a fixed card stop at one end thereof, for positioning and holding in position a record card therein against the card stop.

Other objects of the invention will be pointed out in the following description and claims and illustrated in the accompanying drawings, which disclose, by way of examples, the principle of the invention and the best mode, which has been contemplated, of applying that principle.

Figure 1:
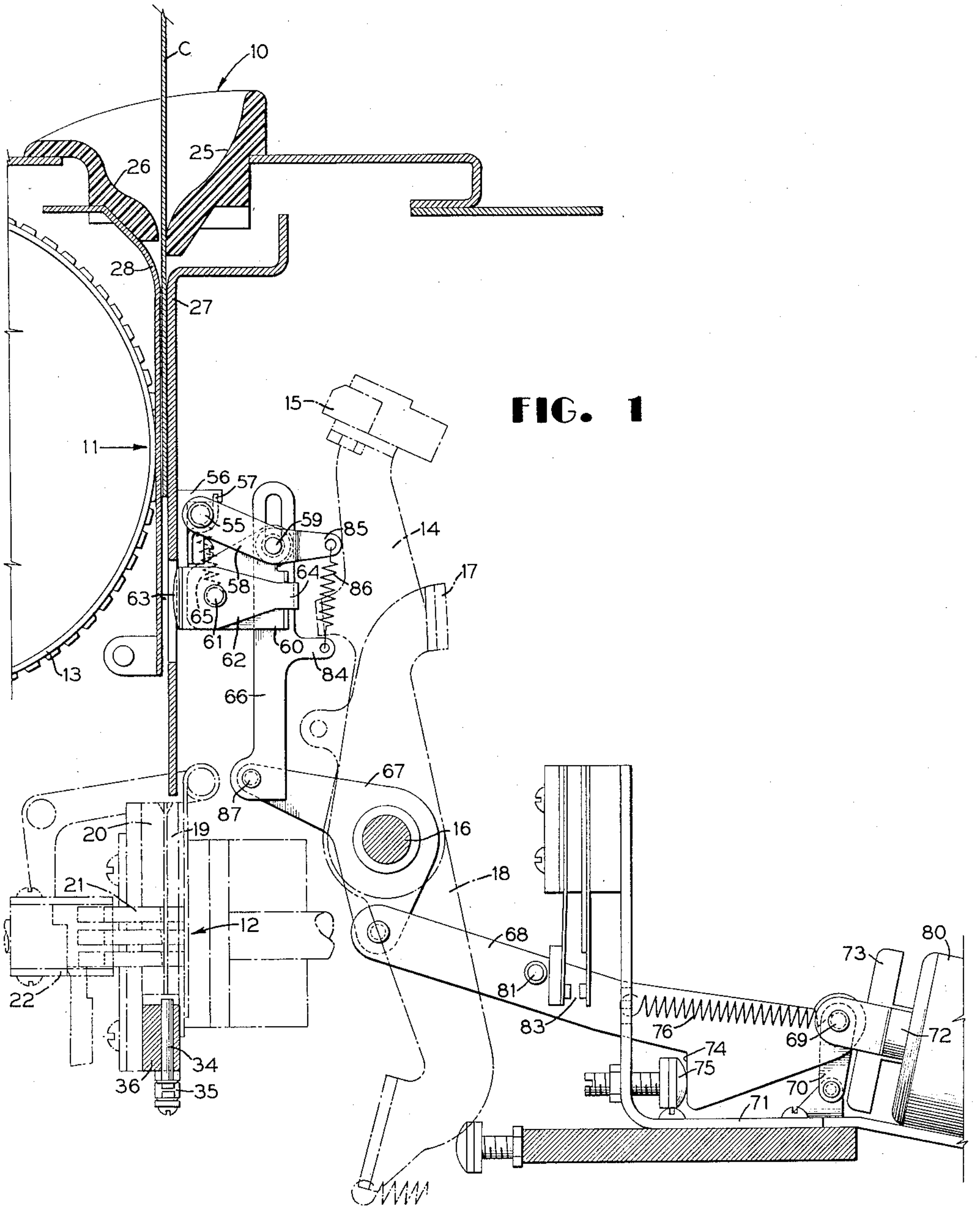
Fig. 1 is a side elevation view of a record card receiver having a card positioning and holding mechanism.

Referring to Fig. 1, the record card receiver identified in general by reference numeral 10 is shown to be included in a recorder having a printing station identified by reference numeral 11 and a card punching station identified by reference numeral 12. Inasmuch as the present invention resides in a card receiver having a card positioning and holding mechanism and control apparatus therefor, the printing and punching structure has been fantomed in the drawing for reasons of clarity. Briefly, the printing station 11 is shown to include a type wheel 13 having type elements arranged on the periphery thereof, and a hammer 14 for carrying a platen 15 into and out of the printing zone. Hammer 14 is loosely positioned on hammer shaft 16 and is resiliently connected by a spring (not shown) to a hammer bail 17, the operating arm 18 thereof being connected to shaft 16. To effect a printing stroke, hammer shaft 16 is released for rapid counterclockwise movement when a cam follower (not shown) that is fixed thereto drops off the high dwell of a cam (not shown). It is at this time that the spring force applied to the lower end of hammer bail arm 18 causes the platen 15 to be moved into the printing zone. A conventional camming mechanism is employed to restore hammer 14 to an out-of-print position.

The punching mechanism generally identified by reference numeral 12 is shown to include a die 19, a stripper 20 and punches 21, said punches being selectively moved by a punch carrier 22 and associated apparatus so as to perforate the record card positioned between the die and stripper.

The card receiver identified generally by reference numeral 10 is shown to comprise a guide member having opposed guide surfaces 25 and 26, and a pair of guide plates 27 and 28, said surfaces and said plates being arranged to define a path for the card C. Upon insertion of the card C into the card receiver, the leading edge of the card will first engage a card lever 29 (see also Fig. 2), whereupon the latter will be moved out of the card path as the leading edge of the card causes the card lever 29 to move in a counterclockwise direction about connecting stud 30. A continued insertion of the card will cause the card to be moved within a slot defined by the die 19 (Fig. 1) and stripper 20, and into engagement with the operating stem 34 for control contacts 35. As the description advances, it will be shown that consequent upon control contacts 35 being closed as a result of the leading edge of card C acting upon operating stem 34, the card positioning and holding mechanism will position the leading edge of card C against a fixed card stop 36 and maintain the card in this position until the recorder operation, e. g., a recorder cycle, has been completed.

Figure 2:
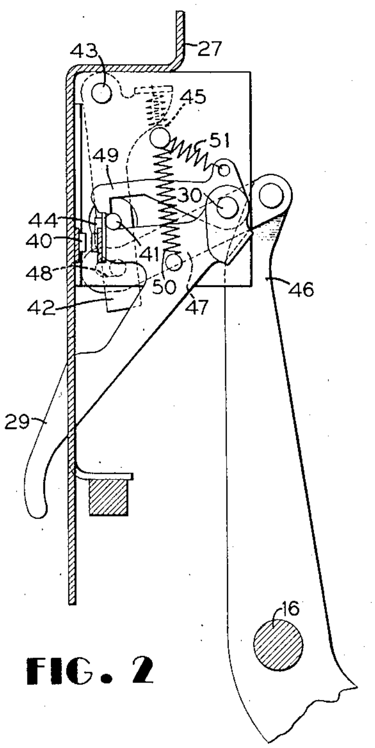
Fig. 2 is a side elevation view of a card insertion detecting mechanism.

Prior to describing the card positioning and holding mechanism in detail, it will be necessary to describe the card inserted contacts operating mechanism shown in Fig. 2. The normally open card inserted contacts 40 are positioned to be operated upon by a pin 41 projecting from an arm 42 loosely connected at its upper end to a pivot stud 43. Normally, pin 41 is in engagement with a projection 44 on card lever 29. As the leading edge of a card C engages card lever 29, however, pin 41 is released by projection 44, to thereby permit arm 42 to which pin 41 is fixed to move, under the urging of a spring 45, in a clockwise direction about pivot stud 43. As indicated previously, this clockwise movement of arm 42 causes pin 41 to close the card inserted contacts 40 which, as will be described in detail hereinafter, indicate the presence of a card in a card receiver prior to a recorder cyclic operation.

During a recorder cycle, cam follower lever 46 which is loosely mounted on hammer shaft 16 (see also Fig. 1), is caused to move in a clockwise direction about shaft 16 so as to move link 47 to the right and carry with it arm 42 via a pin and slot connection 48, said pin being fixed to arm 42. Arm 42 will be carried back, i. e., in a counterclockwise direction about pivot stud 43, an amount which is sufficient for arm latch 49 to engage pin 41. Thus, after a recorder operation the card inserted contacts 40 will be maintained open due to the arm latch 49 engaging pin 41 notwithstanding the fact that card lever 29 is in an operated position. It may be pointed out now that when a card is removed from the card receiver after a recorder operation has taken place, the clockwise motion imparted to card lever 29 by card lever spring 50 is sufficient to overcome the counterclockwise force applied to arm latch 49 by latch spring 51 so that arm latch 49 is moved clockwise about connecting stud 30 on which it is pivotally mounted and out of engagement with pin 41. Of course, pin 41 will engage projection 44 on card lever 29, and the card inserted contacts control apparatus will be ready to detect the insertion of another card.

Figure 3:
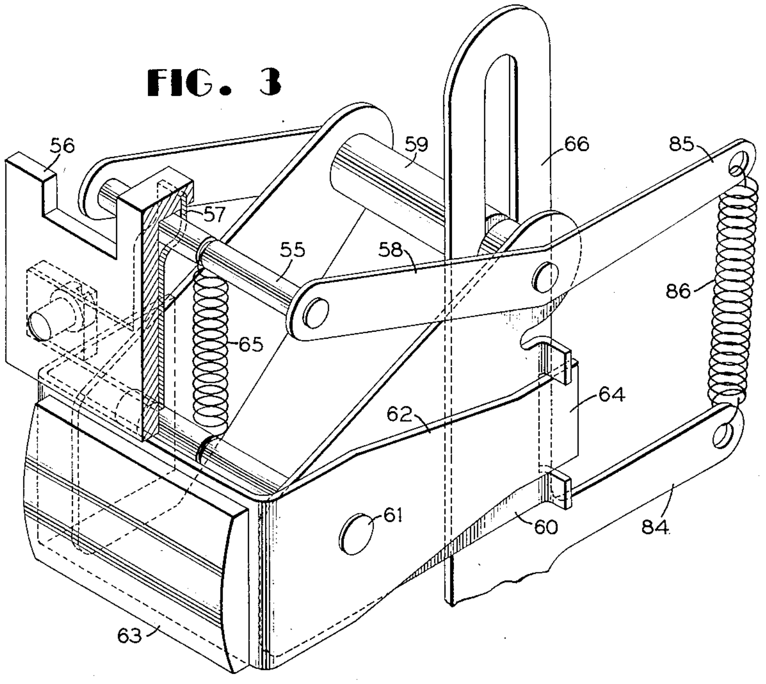
Fig. 3 is a perspective view, somewhat diagrammatic in character, of a card positioning and holding mechanism.

Referring in particular to Figs. 1 and 3, a toggle shaft 55 is held rigidly in place by a toggle shaft block 56 which is secured to guide plate 27, and a toggle shaft spring clamp 57. A double levered swinging element 58 having an intermediate shaft 59 secured thereto is pivotally mounted on shaft 55. A double link card lock assembly supporting member 60 having a floating shaft 61 connected thereto, is pivotally mounted on intermediate shaft 59. A card lock assembly 62 having a card engaging facing of non-skid material 63 thereon, is loosely positioned on floating shaft 61. The end 64 of assembly 62 is positioned between two ears extending from a swinging element 60, to thereby prevent any appreciable rotational movement of assembly 62 about shaft 61. In addition, shaft 61 is connected by a spring 65 to toggle shaft 55.

An operating arm 66 is connected by a slot in its upper end to intermediate shaft 59, and to a bell crank 67 at its lower end. The other end of bell crank 67 is connected by a stud to a connecting link 68, said link being connected at its other end to a supporting link shaft 69. The link shaft is connected for support to a link 70, the lower end of which is pivotally connected to the solenoid bracket 71. Solenoid core 72 is also connected to shaft 69, whereas T-shaped armature 73 is attached to core 72 for movement therewith. The land 74 on link 68 is normally positioned against bumper 75 due to the force applied to shaft 69 by restoring spring 76.

Hence, when solenoid 80 is energized so as to attract thereto core 72 and armature 73, connecting link 68 is moved to the right as shown in Fig. 1, and bell crank 67 is moved in a counterclockwise direction about hammer shaft 16 on which it is loosely positioned. As a result of link 68 being moved to the right, a pin 81 attached thereto causes recorder clutch contacts 83 to close (see also Fig. 4), the purpose of which will be described in detail hereinafter in connection with the circuit diagram.

Returning to Fig. 1 once again, the counterclockwise motion imparted to bell crank 67 causes operating arm 66 to move in a downward direction. Inasmuch as extension 84 of arm 66 and extension 85 of a swinging element 58 are resiliently connected by a spring 86, intermediate shaft 59 is caused to move in a clockwise direction about toggle shaft 55. It is to be observed that arm 66 will tend to pivot slightly about connecting stud 87 inasmuch as the upper end of arm 66 is connected to intermediate shaft 59. The pivoting motion of intermediate shaft 59 will be applied to floating shaft 61 through lock supporting member 60. Furthermore, this pivoting motion will be imparted to the lock assembly 62 and card engaging facing 63 via floating shaft 61. However, inasmuch as operating spring 86 applies a greater force to swinging element 58 and therefore shaft 59, than does toggle spring 65 to floating shaft 61, when facing 63 engages the card C in the card receiver, continued movement of arm 66 as a result of bell crank 67 rocking in a counterclockwise direction about shaft 16, will cause floating shaft 61 to move in a direction away from toggle shaft 55. That is, facing 63 will be moved in a direction substantially parallel to the direction of insertion of card C, to thereby move card C which it engages against fixed card stop 36. When the leading edge of card C engages card stop 36, the frictional contact between the card and facing 63 being sufficient to prevent a relative movement therebetween, the continued motion applied to operating arm 66 is taken by operating spring 86. That is, spring 86 simply stretches while facing 63 remains motionless to hold card C in a position whereby the leading edge thereof is maintained in contact with card stop 36 and the data index positions of the card are kept in alignment with the recorder recording elements. When armature 73 engages solenoid 80, arm 66 will no longer be moved.

Upon the de-energization of solenoid 80, restoring spring 76 causes shaft 69 to move to the left, carrying with it connecting link 68. As bell crank 67 is moved in a clockwise direction, operating arm 66 is moved upwardly, whereby the card positioning and holding mechanism is restored. Prior to land 74 engaging bumper 75, the upper surface of lock assembly 62 abuts toggle shaft lock 56 so that the lock assembly and, particularly, floating shaft 61 can no longer move upwardly. As should be apparent, since restoring spring 76 applies a considerable force to move connecting link 68 to the left and therefore land 74 into contact with bumper 75, the lower end of the slot within operating arm 66 will cause intermediate shaft 59 to continue its counterclockwise pivoting movement about toggle shaft 55. In view of the fact that the upper surface of lock assembly 62 is against the abutment presented by block 56, floating shaft 61 is also caused to pivot in a counterclockwise direction about toggle shaft 55, whereby facing 63 is similarly moved. Thus, the spacing defined by the card path on the one side and the surface of facing 63 on the other side may be adjusted by moving bumper 75 to the left or right so as to determine the position of connecting link 68. This spacing may be .015 inch, for example.

Figure 4:
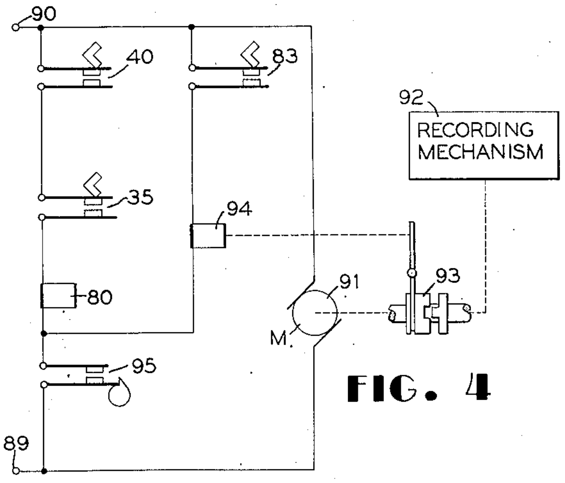
Fig. 4 is a wiring diagram for the card positioning and holding mechanism electrical control apparatus.

Referring to the circuit diagram shown in Fig. 4, a suitable voltage supply is applied to terminals 89 and 90.

A drive motor 91 is connected directly across the line so as to be continuously operating. The recording mechanism which is intended to include the print station and punch station apparatus is represented by a block 92, the driven parts of the mechanism in block 92 being connected to continuously operating motor 91 by a conventional clutch 93. The magnet for operating clutch 93 is identified by reference numeral 94 and is connected in series circuit across the line with clutch control contacts 83 and a commutator cam 95. It may be pointed out here that the commutator cam 95 is included with the driven mechanism within block 92 so that the cam is operated only when clutch 93 is operated to directly connect motor 91 to the mechanism in block 92. Card positioning and holding solenoid 80 is shown to be connected in series circuit across the line with card inserted contacts 40 (see also Fig. 2) and control contacts 35 (see also Fig. 1) and commutator contacts 95.

When the leading edge of card C engages operating stem 34 so as to close control contacts 35, card inserted contacts 40 having already been closed as a result of the leading edge of card C acting upon card lever 29, solenoid 80 (Fig. 4) is energized by a circuit from terminal 90 through contacts 40, 35 and 95, to terminal 91. Energization of the solenoid causes pin 81 (see also Fig. 1) to close clutch control contacts 83 (see also Fig. 4), to thereby complete a circuit to clutch magnet 94 from terminal 90 through contacts 83 and 95, to terminal 91. The energization of magnet 94 causes the operation of clutch 93, whereby a recorder operation is effected. During this recorder cycle, cam contacts 95 are caused to separate so as to open the circuits to solenoid 80 and clutch magnet 94. In addition, it will be recalled, card inserted contacts 40 (see also Fig. 2) will be opened as a result of arm 42 being moved in a counterclockwise direction about pivot stud 43 by link 47. Thus, when cam contacts 95 close once again prior to the end of the recorder operation, solenoid 80 will not be energized for a second time so long as the card already processed remains in the card receiver; i. e., card inserted contacts 40 will remain open until the processed card is removed from the card receiver and another card is inserted thereafter.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a recorder, the combination of a record receiver having an opening at one end thereof, and a fixed record stop and a control switch at the other end thereof; a movable control switch governing element for abutting the leading edge of a record inserted in said receiver, said control switch being rendered operated when a record is partially inserted in said receiver to cause the leading edge of the record to move said governing element; a solenoid; a movable record positioner adapted to frictionally contact a record in said receiver; an electric circuit including said switch and said solenoid whereby said solenoid is rendered operated when said switch is operated; a toggle assembly for controlling the movement of said record positioner; and a link assembly for operatively connecting said toggle assembly to said solenoid, whereby in response to the energization of said solenoid said record positioner is first moved into frictional contact with the record in said receiver and then moved while maintaining such frictional contact to position the leading edge of the record against said fixed record stop.

2. In a recorder according to claim 1, a second switch; an element attached to said link assembly for controlling said second switch, whereby said second switch is operated in response to the energization of said solenoid; means for effecting a recorder operation whereupon a data output means processes the record in said record receiver; an electrical circuit including said second switch and said recorder operation effecting means for activating said latter means consequent upon the operation of said second switch; and an electrical interrupter controlled by said recorder operation effecting means to de-energize said solenoid after the record is processed, whereby said record positioner is restored to a non-operated status.

3. In a machine having recording elements for recording indicia on a record card having data index positions thereon, the combination of a record card receiver having an opening at one end thereof and a control switch at the other end thereof, a movable control switch governing element for abutting the leading edge of a record card inserted in said receiver, said control switch being rendered operated when a record card is inserted in said receiver to cause the leading edge of the record card to move said governing element, an electromagnet, a movable record card positioner adapted to engage a record card in said receiver, an electric circuit including said switch and said electromagnet whereby said electromagnet is rendered operated when said control switch is operated, a toggle assembly for controlling the movement of said record card positioner, and a link assembly for operatively connecting said toggle assembly to said electromagnet, whereby in response to the energization of said electromagnet said record card positioner is moved to first engage the record card and then to position the record card so that the data index positions thereon are in recording alignment with said recording elements.

4. A mechanism of the class described comprising a record card guide assembly having a fixed card stop at one end thereof; a toggle shaft fixed to said assembly; a swinging double lever element having an intermediate shaft connected thereto for pivoting about said toggle shaft in a plane substantially normal to the card path defined by said assembly; a lock assembly having a card engaging friction facing secured thereto; a lock assembly supporting cage having a floating shaft secured thereto, said supporting cage being pivotally mounted on said intermediate shaft, and said lock assembly being supported by said floating shaft; a toggle spring for resiliently connecting said floating shaft to said toggle shaft; an operating arm; an operating spring for resiliently connecting said operating arm to said swinging double lever element; and means for moving said operating arm an initial amount whereby the force exerted by said operating spring upon said intermediate shaft causes said lock assembly to pivot with said floating shaft about said toggle shaft towards the card path to thereby effect an engagement between said friction facing and the record card, and another amount whereby said lock assembly in frictional engagement with the record card is caused to move with said floating shaft in a direction substantially parallel to the card path so as to move the leading edge of the record card against said fixed card stop as a result of the force applied to said intermediate shaft by said operating spring being greater than the force applied to the floating shaft by said toggle spring.

5. A mechanism of the class described comprising a record card guide assembly having a fixed card stop at one end thereof; a toggle shaft fixed to said assembly; a swinging double lever element having an intermediate shaft connected thereto for pivoting about said toggle shaft in a plane substantially normal to the card path defined by said assembly; a lock assembly having a card engaging friction facing secured thereto; a lock assembly supporting cage having a floating shaft secured thereto, said supporting cage being pivotally mounted on said intermediate shaft, and said lock assembly being supported for movement by said floating shaft; a toggle spring for resiliently connecting said floating shaft to said toggle shaft; an operating arm; an operating spring for resiliently connecting said operating arm to said swinging double lever element; and means for moving said operating arm an initial amount whereby the force exerted by said operating spring upon said intermediate shaft causes said lock assembly to pivot with said floating shaft about said toggle shaft towards the card path to thereby effect an engagement between said friction facing and the record card, an intermediate amount whereby said lock assembly in frictional engagement with the record card is caused to move with said floating shaft in a direction substantially parallel to the card path so as to move the leading edge of the record card against said fixed card stop as a result of the force applied to said intermediate shaft by said operating spring being greater than the force applied to the floating shaft by said toggle spring, and a final amount whereby said lock assembly in frictional engagement with the record card is caused to remain stationary with said floating shaft so as to maintain the leading edge of the record card against said fixed card stop as a result of the frictional force between said friction facing and the record card being greater than the force applied to the intermediate shaft by said operating spring.

6. A mechanism of the class described comprising a record guide assembly having a fixed record stop at one end thereof, record operated means for detecting a partial insertion of a record into said record guide assembly, movable means adapted to engage a record partially inserted into said record guide assembly, a toggle assembly for controlling the movement of said movable means, motive means controlled by said record operated means to be rendered operated consequent upon the detection of a record partially inserted into said assembly, and a link assembly for operatively connecting said toggle assembly to said motive means whereby said movable means are operated to move a partially inserted record against said fixed record stop in response to the operation of said movable means.

7. In a machine having recording elements for recording indicia on a record card having data index positions thereon, the combination of a card receiver having an opening at one end thereof and a card biasing element at the other end thereof, said element being adapted to apply a force to a card whereby the card is biased to move in a direction out of said card receiver; a control switch governed by said biasing element and adaptable for operation consequent upon the leading edge of a card being inserted in said card receiver moving said biasing element in the direction of card insertion; normally inoperative movable frictional card engaging means for moving a card to a position against the action of said biasing element so that the data positions on the card are in recording alignment with said recording elements, said movable card engaging means including a toggle assembly for controlling the movement thereof; and electrical motive means operatively connected to said toggle assembly and governed by said control switch so as to render operated said movable card engaging means in response to the operation of said control switch, to thereby position a card in recording alignment with said recording elements.

8. A machine according to claim 7 additionally comprising a second switch; means governed by said electrical motive means for controlling said second switch; a drive means; a clutch mechanism; a clutch magnet for controlling said clutch mechanism; an electrical circuit including said second switch and said clutch magnet, whereby said clutch mechanism operatively connects said drive means to said recording elements in response to the operation of said clutch magnet, consequent upon said electrical motive means rendering operated said second switch; and an electrical interrupter controlled by said clutch mechanism during a recorder operation to disable said electrical motive means, whereby said movable means is restored to a non-operated status and said card biasing element moves the record card in the direction out of said card receiver.

References Cited in the file of this patent

UNITED STATES PATENTS

| | | |
|---|---|---|
| 1,412,839 | Bryce | Apr. 18, 1922 |
| 2,084,097 | Long | June 15, 1937 |
| 2,281,998 | Rast | May 5, 1942 |